(12) United States Patent
Chen et al.

(10) Patent No.: US 10,248,510 B2
(45) Date of Patent: Apr. 2, 2019

(54) GUARDRAILS FOR COPY DATA STORAGE

(71) Applicant: Actifio, Inc., Waltham, MA (US)

(72) Inventors: Yong-Min Chen, Waltham, MA (US); Madhav Mutalik, Southborough, MA (US); Micah Waldman, Waltham, MA (US)

(73) Assignee: Actifio, Inc., Waltham, MA (US)

( * ) Notice: Subject to any disclaimer, the term of this patent is extended or adjusted under 35 U.S.C. 154(b) by 345 days.

(21) Appl. No.: 14/855,545

(22) Filed: Sep. 16, 2015

(65) Prior Publication Data

US 2016/0078080 A1 Mar. 17, 2016

Related U.S. Application Data

(60) Provisional application No. 62/063,180, filed on Oct. 13, 2014, provisional application No. 62/051,138, filed on Sep. 16, 2014.

(51) Int. Cl.
*G06F 17/30* (2006.01)
*G06F 11/14* (2006.01)
(Continued)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0641* (2013.01); *G06F 3/0683* (2013.01); *G06F 11/1435* (2013.01); *G06F 11/1453* (2013.01);
(Continued)

(58) Field of Classification Search
None
See application file for complete search history.

(56) References Cited

U.S. PATENT DOCUMENTS 4,626,829 A 12/1986 Hauck
5,381,545 A 1/1995 Baker et al.
(Continued)

OTHER PUBLICATIONS

International Search Report and Written Opinion issued by the U.S. Patent and Trademark Office as International Searching Authority for International Application No. PCT/US15/050391 dated Jan. 19, 2016 (12 pgs.)

(Continued)

*Primary Examiner* — Bai D Vu
(74) *Attorney, Agent, or Firm* — Wilmer Cutler Pickering Hale and Dorr LLP

(57) ABSTRACT

Techniques are disclosed for preventing a user from configuring a service level agreement from creating a data management schedule that creates a set of data backups that exceeds data resource limits available for storing the set of data backups. A first amount of pool resources associated with the backup of each of the at least one application is determined according to a received schedule. A first amount of data volumes associated with the backup of each of the at least one application is determined according to the received schedule. A resource shortage warning is transmitted when the aggregate amount of pool resources exceeds an available amount of pool resources or the aggregate amount of data volume resource exceeds an available amount of data volume resource, thereby preventing a user from configuring a service level agreement that exceeds data resource limits.

20 Claims, 6 Drawing Sheets

(51) Int. Cl.
*G06F 3/06* (2006.01)
*H04L 12/24* (2006.01)

(52) U.S. Cl.
CPC ...... *G06F 11/1456* (2013.01); *G06F 11/1461* (2013.01); *G06F 11/1464* (2013.01); *G06F 17/30215* (2013.01); *G06F 17/30371* (2013.01); *H04L 41/5003* (2013.01); *G06F 2201/84* (2013.01)

(56) References Cited

U.S. PATENT DOCUMENTS

| | | |
|---|---|---|
| 5,410,667 A | 4/1995 | Belsan et al. |
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |
| 5,857,208 A | 1/1999 | Ofek |
| 5,963,962 A | 10/1999 | Hitz et al. |
| 6,065,018 A | 5/2000 | Beier et al. |
| 6,081,875 A | 6/2000 | Clifton et al. |
| 6,119,208 A | 9/2000 | White et al. |
| 6,131,148 A | 10/2000 | West et al. |
| 6,148,412 A | 11/2000 | Cannon et al. |
| 6,163,856 A | 12/2000 | Dion et al. |
| 6,192,444 B1 | 2/2001 | White et al. |
| 6,199,146 B1 | 3/2001 | Pence |
| 6,202,071 B1 | 3/2001 | Keene |
| 6,212,531 B1 | 4/2001 | Blea et al. |
| 6,226,759 B1 | 5/2001 | Miller et al. |
| 6,269,381 B1 | 7/2001 | St. Pierre et al. |
| 6,269,431 B1 | 7/2001 | Dunham |
| 6,324,548 B1 | 11/2001 | Sorenson |
| 6,330,614 B1 | 12/2001 | Aggarwal et al. |
| 6,434,681 B1 | 8/2002 | Armangau |
| 6,460,055 B1 | 10/2002 | Midgley et al. |
| 6,477,591 B1 | 11/2002 | VanderSpek |
| 6,484,186 B1 | 11/2002 | Rungta |
| 6,487,561 B1 | 11/2002 | Ofek et al. |
| 6,557,089 B1 | 4/2003 | Reed et al. |
| 6,625,704 B2 | 9/2003 | Winokur |
| 6,654,772 B1 | 11/2003 | Crow et al. |
| 6,654,912 B1 | 11/2003 | Viswanathan et al. |
| 6,665,815 B1 | 12/2003 | Goldstein et al. |
| 6,668,264 B1 | 12/2003 | Patterson et al. |
| 6,772,302 B1 | 8/2004 | Thompson |
| 6,779,094 B2 | 8/2004 | Selkirk et al. |
| 6,823,336 B1 | 11/2004 | Srinivasan et al. |
| 6,823,436 B2 | 11/2004 | Krishnamurthy |
| 6,850,929 B2 | 2/2005 | Chang et al. |
| 6,898,688 B2 | 5/2005 | Martin et al. |
| 6,915,397 B2 | 7/2005 | Lubbers et al. |
| 6,928,526 B1 | 8/2005 | Zhu et al. |
| 6,948,039 B2 | 9/2005 | Biessener et al. |
| 6,957,362 B2 | 10/2005 | Armangau |
| 7,072,916 B1 | 7/2006 | Lewis et al. |
| 7,143,251 B1 | 11/2006 | Patterson |
| 7,222,194 B2 | 5/2007 | Kano et al. |
| 7,251,708 B1 | 7/2007 | Justiss et al. |
| 7,325,111 B1 | 1/2008 | Jiang |
| 7,346,623 B2 | 3/2008 | Prahlad et al. |
| 7,386,695 B2 | 6/2008 | Fuente |
| 7,428,657 B2 | 9/2008 | Yamasaki |
| 7,467,267 B1 | 12/2008 | Mayock |
| 7,552,294 B1 | 6/2009 | Justiss |
| 7,574,461 B1 | 8/2009 | Armorer et al. |
| 7,647,355 B2 | 1/2010 | Best et al. |
| 7,689,633 B1 | 3/2010 | Li et al. |
| 7,707,184 B1 | 4/2010 | Zhang et al. |
| 7,797,284 B1 | 9/2010 | Chellappa et al. |
| 7,814,128 B2 | 10/2010 | Silvers et al. |
| 7,937,547 B2 | 5/2011 | Liu et al. |
| 8,037,032 B2 | 10/2011 | Pershin et al. |
| 8,095,756 B1 | 1/2012 | Somavarapu et al. |
| 8,139,575 B2 | 3/2012 | Biran et al. |
| 8,150,808 B2 | 4/2012 | Zha et al. |
| 8,161,077 B2 | 4/2012 | Zha et al. |
| 8,180,740 B1 | 5/2012 | Stager et al. |
| 8,180,742 B2 | 5/2012 | Claudatos et al. |
| 8,299,944 B2 | 10/2012 | Provenzano |
| 8,407,191 B1 | 3/2013 | Nanda |
| 8,468,174 B1 | 6/2013 | Yueh et al. |
| 8,548,944 B2 | 10/2013 | Yueh |
| 8,566,361 B2 | 10/2013 | Zha et al. |
| 8,706,833 B1 | 4/2014 | Bergant et al. |
| 8,732,418 B1 | 5/2014 | Abdulla |
| 8,788,769 B2 | 7/2014 | Abercrombie et al. |
| 9,098,432 B1 | 8/2015 | Bachu et al. |
| 9,165,001 B1 | 10/2015 | Upadhyay et al. |
| 9,171,002 B1 | 10/2015 | Mam et al. |
| 9,384,200 B1 | 7/2016 | Batchu et al. |
| 9,519,432 B1* | 12/2016 | Haustein ............. G06F 11/00 |
| 2002/0111929 A1 | 8/2002 | Pudipeddi et al. |
| 2002/0129214 A1 | 9/2002 | Sarkar |
| 2003/0101321 A1 | 5/2003 | Ohran |
| 2003/0140070 A1 | 7/2003 | Kaczmarski et al. |
| 2003/0149683 A1 | 8/2003 | Lee et al. |
| 2004/0199570 A1 | 10/2004 | Terao |
| 2005/0004954 A1 | 1/2005 | Soule |
| 2005/0066095 A1 | 3/2005 | Mullick et al. |
| 2005/0138091 A1 | 6/2005 | Bono |
| 2005/0165794 A1 | 7/2005 | Mosescu |
| 2005/0192989 A1 | 9/2005 | Adiba et al. |
| 2006/0059207 A1 | 3/2006 | Hirsch et al. |
| 2006/0074945 A1 | 4/2006 | Mori |
| 2006/0129508 A1 | 6/2006 | Cannon et al. |
| 2006/0245411 A1 | 11/2006 | Chen et al. |
| 2008/0256593 A1 | 10/2008 | Vinberg et al. |
| 2008/0270436 A1 | 10/2008 | Fineberg et al. |
| 2009/0222496 A1 | 9/2009 | Liu et al. |
| 2011/0004601 A1 | 1/2011 | Peckham et al. |
| 2011/0161295 A1 | 6/2011 | Ngo |
| 2011/0258161 A1 | 10/2011 | Constantinescu et al. |
| 2012/0123999 A1 | 5/2012 | Ashutosh et al. |
| 2012/0124046 A1 | 5/2012 | Provenzano |
| 2012/0166448 A1 | 6/2012 | Li et al. |
| 2013/0159646 A1 | 6/2013 | Atzmon et al. |
| 2013/0318463 A1 | 11/2013 | Clifford |
| 2016/0092535 A1 | 3/2016 | Kuchibhotla et al. |
| 2017/0010941 A1* | 1/2017 | Shimada ............. G06F 11/1464 |

OTHER PUBLICATIONS

Alapati, "NetApp Technical Report: SnapMirror Sync and SnapMirror Semi-Sync Overview and Design Considerations," NetApp, Jul. 2010 (24 pages).
American Megatrends, Inc., "StorTrends/ManageTrends (Version 2.7) User's Guide for the StorTends 1300 Storage Appliance" Mar. 23, 2009 (378 pages).
Arrell et al., "Using RVA and SnapShot for Business Intelligence Applications with OS/390 and DB2," IBM, Redbooks, Aug. 1998 (70 pages).
Azagury et al., "Point-in-Time Copy: Yesterday, Today and Tomorrow," IBM Research Lab in Haifa, No Date Listed (pp. 259-270).
Baird, "Virtual Storage Architecture Guide (VSAG)," IEEE, No Month Listed 1995 (pp. 312-326).
Baker, "Disk-Based Mirroring is a Lot More Than Just Safe," Computer Technology Review, No Month Listed 2000 (pp. 55-57).
Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).
Cederqvist et al., "Version Management with CVS," No Month Listed 1992 (122 pages).
Chang et al., "Performance Analysis of Two Frozen Image Based Backup/Restore Methods," IEEE International Conference on Electron Information Technology 2005, May 22-25, 2005 (7 pages).
Chapman et al., "SnapMirror® Best Practices Guide," Network Appliance, Inc., Apr. 2006 (63 pages).
Chatterjee et al., "Efficient Replication Leveraging Information Lifecycle Management in Data Storage Systems," Provisional Patent Application No. Not Available, Feb. 9, 2009 (25 pages).

(56) References Cited

OTHER PUBLICATIONS

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).
Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, filed Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, filed Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).

(56) References Cited

OTHER PUBLICATIONS

Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).

(56) References Cited

OTHER PUBLICATIONS

Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).

Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, filed Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at

(56) References Cited

OTHER PUBLICATIONS

[URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).

* cited by examiner

GUARDRAILS FOR COPY DATA STORAGE

CROSS REFERENCE TO RELATED APPLICATIONS

This application claims the benefit under 35 U.S.C. § 119(e) of Provisional Application No. 62/051,138, filed Sep. 16, 2014, entitled "Apparatus and Computerized Methods for Copy Data Management;" and Provisional Application No. 62/063,180, filed Oct. 13, 2014, entitled "Copy Data Techniques," the entire contents of which are incorporated by reference here in their entirety.

TECHNICAL FIELD

The techniques described herein generally relate to data resource management, and in particular to preventing a user from exceeding data resource limits.

BACKGROUND

A Copy Data Storage system can protect lots of applications with various different complex Service Level Agreements (SLAs). In such an environment, it is easy to set up policies that use too much limited resources, resulting in missing SLAs, or putting system at risk, as the system does not have enough resource to handle the load specified by the SLAs, either due to too many applications, operate the backups too frequently, or keeping the backups for too long. The critical system resource could be storage pool, volumes, or any other limited resources. Traditionally, users wait for the system to break, and look for the cause.

SUMMARY

The disclosed subject matter includes a computerized method of preventing a user from configuring a service level agreement from creating a data management schedule that creates a set of data backups that exceeds data resource limits available for storing the set of data backups. The method is executed by a processor in communication with memory storing instructions configured to cause the processor to receive first data indicative of a schedule to perform a backup of at least one application. The memory stores instructions configured to cause the processor to determine a first amount of pool resources associated with the backup of each of the at least one application according to the received schedule. Determining the first amount of pool resources includes calculating a number of copies of an application associated with the received schedule, determining a change rate parameter comprising at least one of an application specific change rate associated with historical backup data corresponding to each of the at least one application, a system-wide change rate corresponding to change rates associated with applications similar to each of the at least one application, and a generic application change rate, and multiplying the change rate parameter for each the at least one application with a size of the application, and with a number of copies of the application associated with each of the at least one application. The memory stores instructions configured to cause the processor to add the first amount of pool resources for each of the at least one application to form an aggregate amount of pool resources. The memory stores instructions configured to cause the processor to determine a first amount of data volumes associated with the backup of each of the at least one application according to the received schedule. Determining the first amount of data volumes includes determining a second amount of data volumes associated with each copy of the at least one application, and multiplying the second amount of data volumes with the number of copies of the application associated with the received schedule. The memory stores instructions configured to cause the processor to add the first amount of data volumes for each of the at least one application to form an aggregate amount of data volume resource. The memory stores instructions configured to cause the processor to transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

The disclosed subject matter includes a computing system for preventing a user from configuring a service level agreement from creating a data management schedule that creates a set of data backups that exceeds data resource limits available for storing the set of data backups. The computing system includes a processor and a memory coupled to the processor. The memory includes instructions that, when executed by the processor, cause the processor to receive first data indicative of a schedule to perform a backup of at least one application. The memory includes instructions that, when executed by the processor, cause the processor to determine a first amount of pool resources associated with the backup of each of the at least one application according to the received schedule. Determining the first amount of pool resources includes calculating a number of copies of an application associated with the received schedule, determining a change rate parameter comprising at least one of: an application specific change rate associated with historical backup data corresponding to each of the at least one application, a system-wide change rate corresponding to change rates associated with applications similar to each of the at least one application, and a generic application change rate, and multiplying the change rate parameter for each the at least one application with a size of the application, and with a number of copies of the application associated with each of the at least one application. The memory includes instructions that, when executed by the processor, cause the processor to add the first amount of pool resources for each of the at least one application to form an aggregate amount of pool resources. The memory includes instructions that, when executed by the processor, cause the processor to determine a first amount of data volumes associated with the backup of each of the at least one application according to the received schedule. Determining the first amount of data volumes includes determining a second amount of data volumes associated with each copy of the at least one application, and multiplying the second amount of data volumes with the number of copies of the application associated with the received schedule. The memory includes instructions that, when executed by the processor, cause the processor to add the first amount of data volumes for each of the at least one application to form an aggregate amount of data volume resource. The memory includes instructions that, when executed by the processor, cause the processor to transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

The disclosed subject matter includes a non-transitory computer readable medium having executable instructions operable to cause an apparatus to receive first data indicative of a schedule to perform a backup of at least one application. The non-transitory computer readable medium has executable instructions operable to cause an apparatus to determine a first amount of pool resources associated with the backup of each of the at least one application according to the received schedule. Determining the first amount of pool resources includes calculating a number of copies of an application associated with the received schedule, determining a change rate parameter including at least one of: an application specific change rate associated with historical backup data corresponding to each of the at least one application, a system-wide change rate corresponding to change rates associated with applications similar to each of the at least one application, and a generic application change rate, and multiplying the change rate parameter for each the at least one application with a size of the application, and with a number of copies of the application associated with each of the at least one application. The non-transitory computer readable medium has executable instructions operable to cause an apparatus to add the first amount of pool resources for each of the at least one application to form an aggregate amount of pool resources. The non-transitory computer readable medium has executable instructions operable to cause an apparatus to determine a first amount of data volumes associated with the backup of each of the at least one application according to the received schedule. Determining the first amount of data volumes includes: determining a second amount of data volumes associated with each copy of the at least one application; and multiplying the second amount of data volumes with the number of copies of the application associated with the received schedule. The non-transitory computer readable medium has executable instructions operable to cause an apparatus to add the first amount of data volumes for each of the at least one application to form an aggregate amount of data volume resource. The non-transitory computer readable medium has executable instructions operable to cause an apparatus to transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

A better approach is to analyze the SLAs and applications that they protect and to warn the user if the overall protection will exceed the system limit (e.g., data storage space allowable for the overall protection configured by the SLAs), before the user actually exceeds the system limit. This allows user to plan ahead for future expansion and guard against over allocating resources on the system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Figure 1:
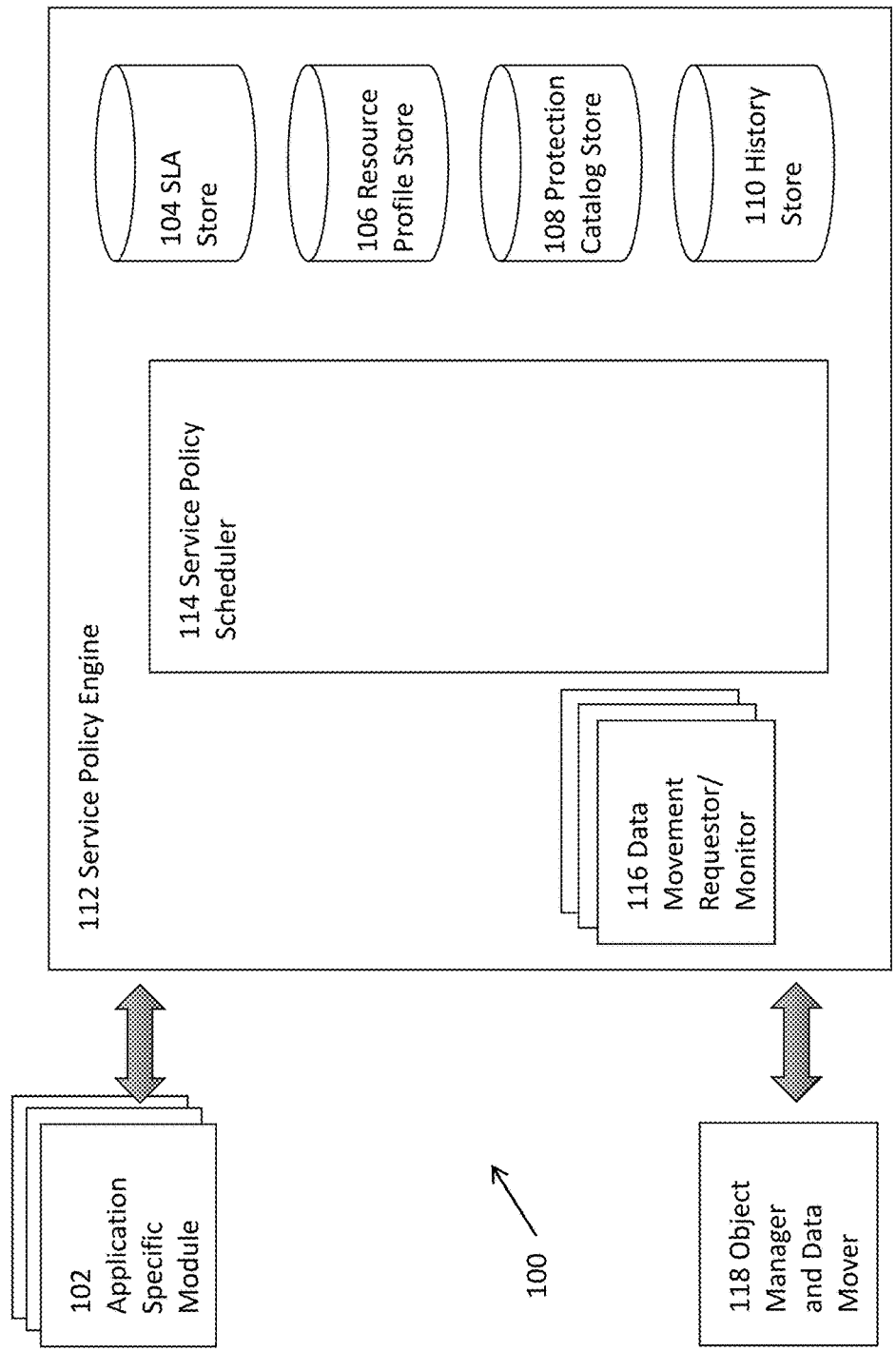
FIG. 1 is a system diagram showing a backup application, according to some embodiments.

FIG. 1 is a system diagram showing a backup application 100, according to some embodiments. Backup application 100 includes an application specific module 102, SLA store 104, resource profile store 106, protection catalog store 108, history store 110, service policy engine 112, service policy scheduler 114, data movement requestor/monitor 116, and object manager data and mover 118.

Service policy engine, 112, with the service policy scheduler 114, determines when to perform a backup, based on information in protection catalog store 108 that protects the application. Then using policy information from SLA store 104. At which time, it communicates with application specific module, to place the application in a consistency state, if necessary, then send the changed data to service policy engine. Service policy engine stores the changed data at appropriate pool, which is specified in resource profile store 106, using object manager data and mover 118. At the successful completion of the job, information about the job is stored in history store 110. Additional details regarding an exemplary backup application can be found in U.S. application Ser. No. 13/920,950, filed on Jun. 18, 2013, entitled "System and Method for Intelligent Database Backup," the disclosure of which is herein incorporated by reference in its entirety.

Figure 2:
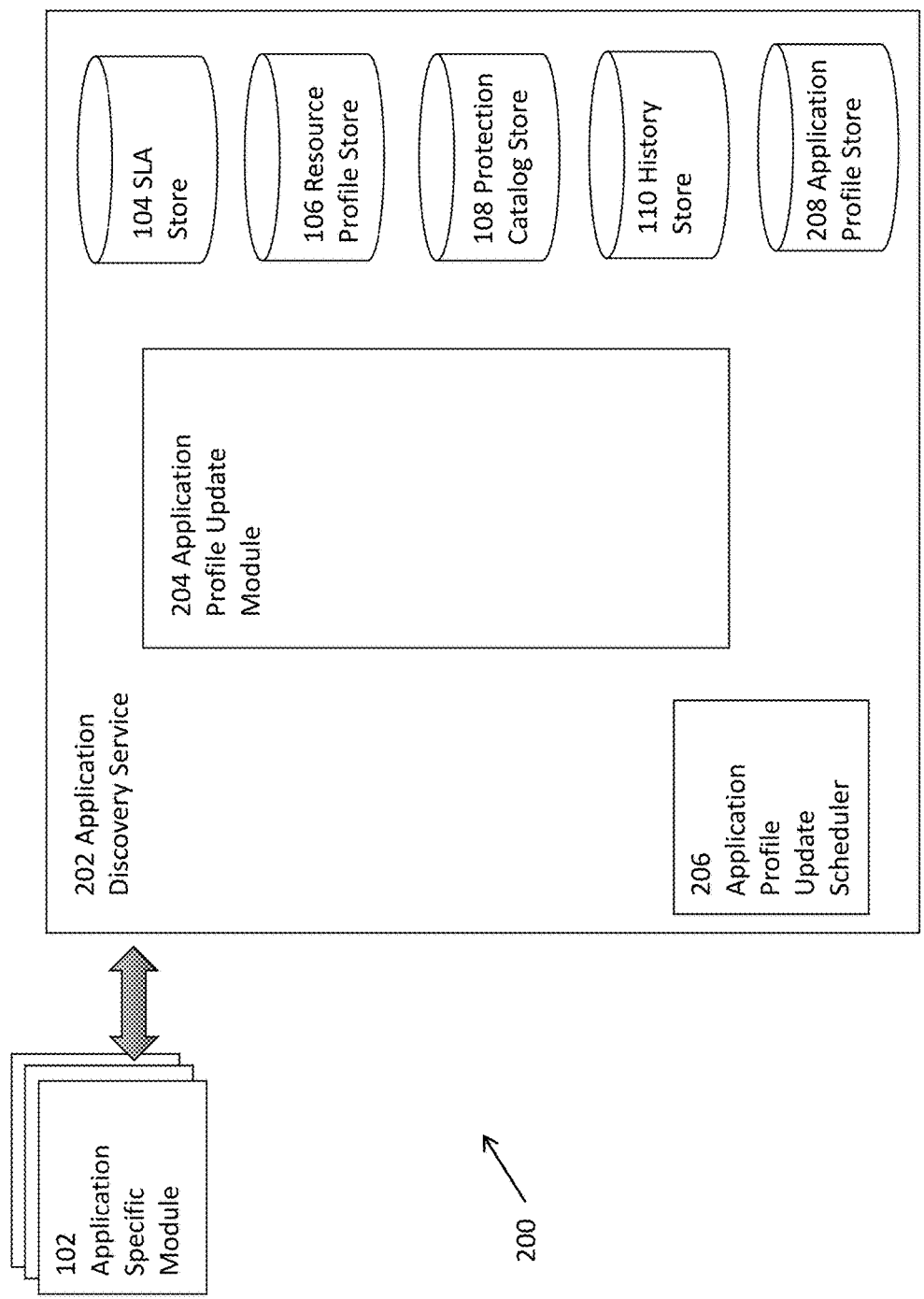
FIG. 2 is a system diagram showing a backup application with guardrails 200, according to some embodiments.

FIG. 2 is a system diagram showing a backup application with guardrails 200, according to some embodiments.

Backup application with guardrails 200 includes an application specific module 102, SLA store 104, resource profile store 106, protection catalog store 108, history store 110, service policy engine 112, application discovery service 202, application profile update module 204, application profile update scheduler 206, and application profile store 208.

An application is discovered through application discovery service 202, which communicates with application specific module 102, to discover information pertinent to the application, such as the size of the application, how application data can be retrieved during backup, the disk volumes that the applications reside, type of application, etc. This information is communicated back to application discovery service 202, which then employs application profile update module 204, to store the information in application profile store 208. The application can then be protected by applying SLA from SLA store 104, and resource profile store 106, saving the protection details in protection store 108. As the backup scheduler runs, information regarding the backup job is stored in history store 110, which includes time of the backup, amount of data copied, communication mechanism, etc.

In some embodiments, the application profile update scheduler 206 can be configured to run regularly, such as once a day. As it runs, it examines the information of the successful backups, and compares the information with previously collected application details. There can be a difference between information of the successful backups and information from previously collected application details, as details may not be available at the time of discovery, or the application details may have changed, such as the size may have changed significantly. The details in application profile store 208 are then updated with the latest information through application profile update module 204.

Figure 3:
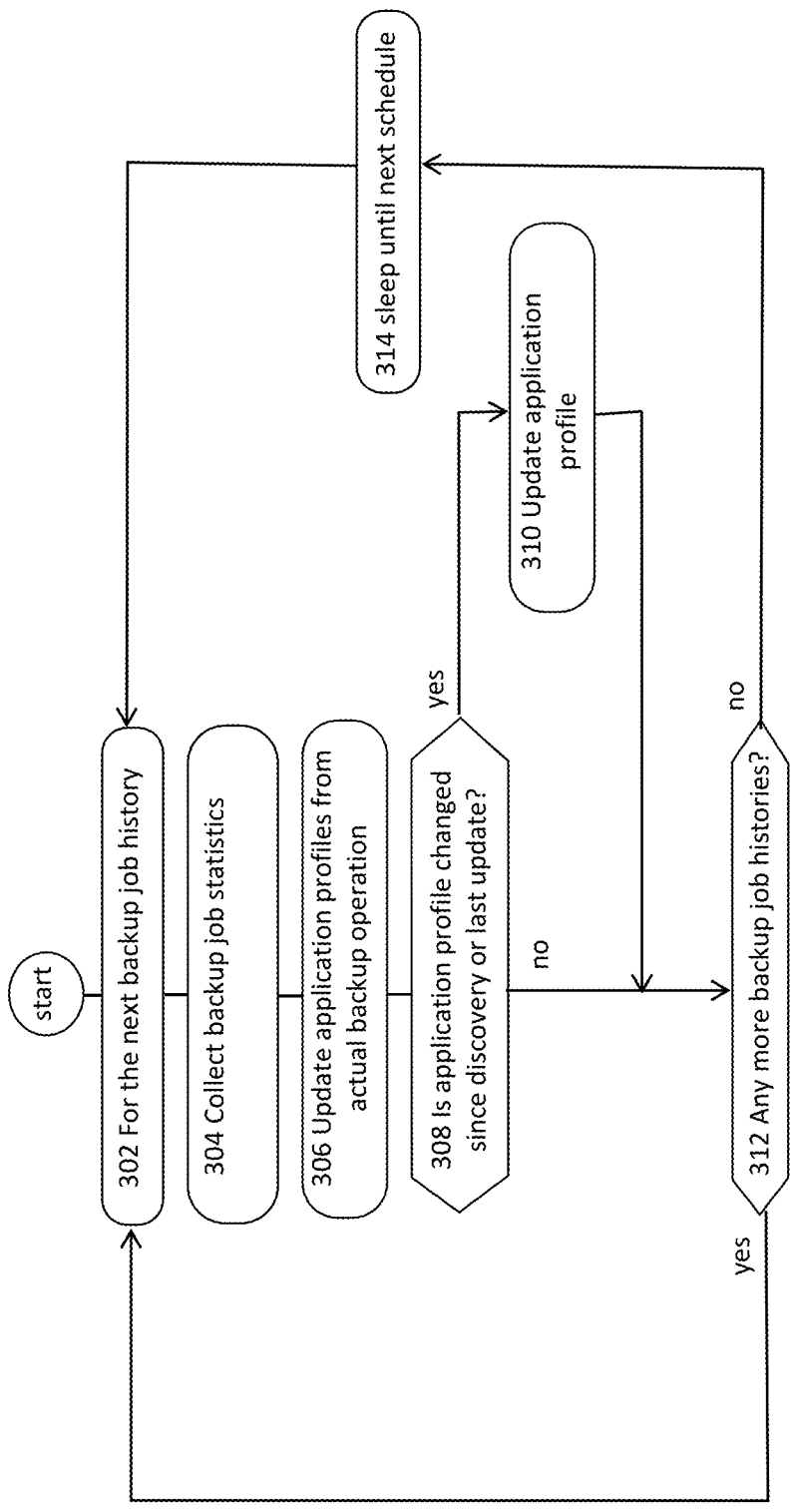
FIG. 3 is a flowchart illustrating a computerized method for performing application profile updates through the application profile update scheduler, according to some embodiments.

FIG. 3 is a flowchart illustrating a computerized method for performing application profile updates through the application profile update scheduler 206, according to some embodiments. The schedule typically runs once a day, but can be run on a different frequency. When it starts, it examines each of the latest successful backups of an application 302, which will have details of the backup operation. In step 304, the details of the backup operation (e.g., backup job statistics) are collected. Application profiles are updated from the actual backup operation 306. Backup operation details are then compared with the saved information of the application 308. If they are the same, the scheduler 206 checks if there are any further backup job histories 312. If backup operation details are not the same, application information is updated with the detail from latest backup 310. Application information is related to static information about the application, such as the details about the volumes that makes up the application, including the size and universally unique identifier (UUID) of the volume. Also included are number of volumes, and how the data is captured, etc. There can be other information regarding the backup that is also useful (e.g., how long the backup takes, CPU resources needed to complete a task).). In addition, number of bytes copied is also collected for each backup. Number of bytes copied can be related to data changed in the application. This metric can be used to calculate the change rate. As more backups are collected, the average of these backups informs the change rate of the application, which can be saved as part of the application details. Other information like the dedup efficiency (data reduced through deduplication), and the compression efficiency (data reduced through compression), can also be gathered if the operation is a dedup backup operation. This information can be helpful in determining how much storage is needed for future backup jobs. Next, a check is performed to determine if there are any more backup job histories 312. If yes, the process continues until all protected applications are examined. If not, application profile update scheduler 206 sleeps until the next schedule 314.

Calculating the resource required depends on the type of resources in the Copy Data Storage system. First we need to calculate number of copies per volume for a given SLA. Each SLA is made up of multiple policies, which has a Recovery Point Objective (RPO), and a retention period. It may also contain repeat interval and exclusion interval, and window of operation. With retention, and RPO, we can calculate number of copies required per day. For example, an RPO of 3 hours, will produce 8 copies if window of operation is 24 hours, which is easily calculated by (window-of-operation−1)/RPO+1, which is (24−1)/3+1=8. But if the window of operation is between 9 am to 5 pm, which is (8−1)/3+1=3 the number will be 3 copies per day. Retention time is then multiplied to produce the total copies. To apply selection (such as only weekday), and/or exclusion, we can simply create a pseudo-calendar, and mark off the selection, and exclusion to produce the projected copies required maintaining the SLA.

Figure 4:
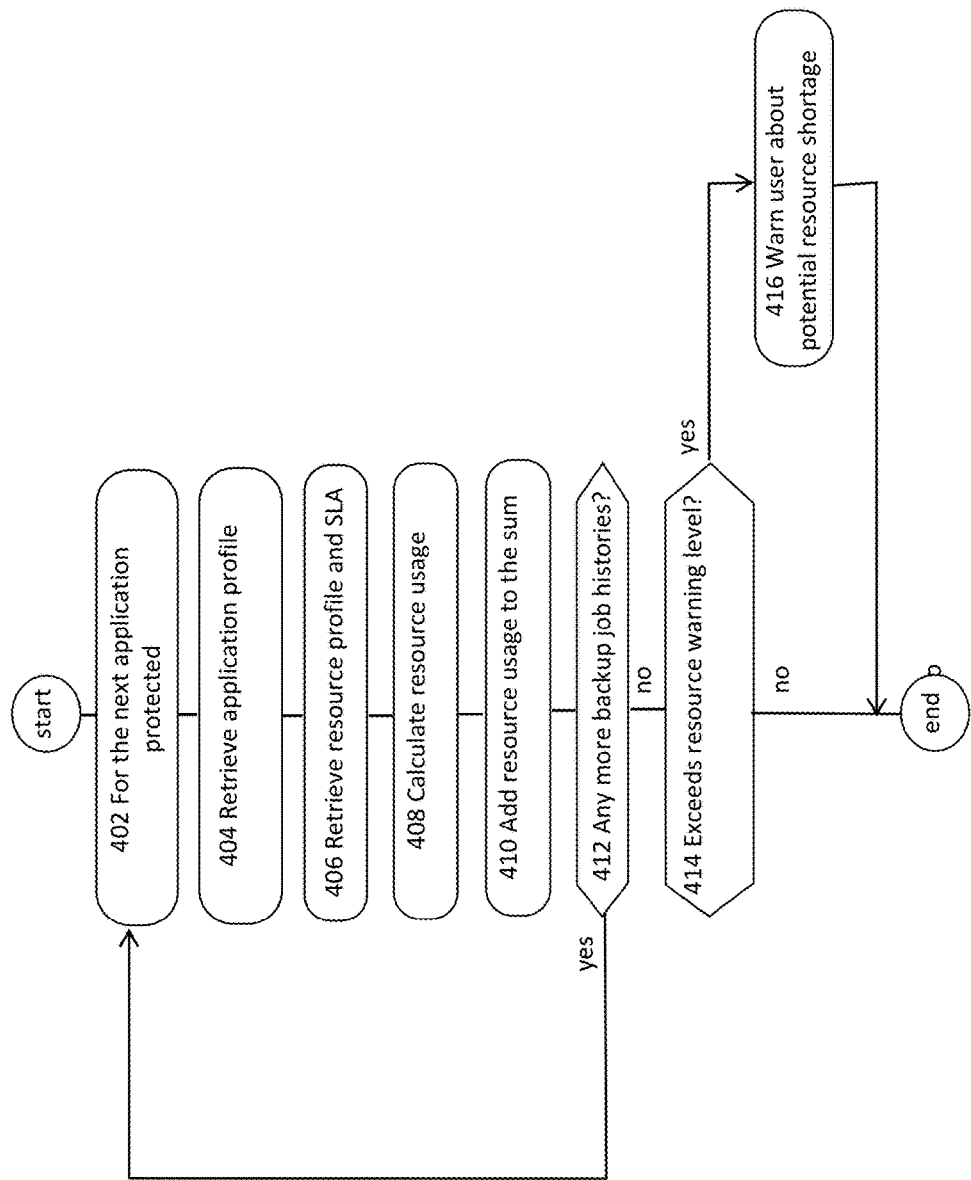
FIG. 4 is a flowchart illustrating the computerized process of potentially warning user about exceeding resource limit when protecting applications, changing application protection with different SLA and/or profile, or changing SLAs, according to some embodiments.

FIG. 4 is a flowchart illustrating the computerized process of potentially warning user about exceeding resource limit when protecting applications, changing application protection with different SLA and/or profile, or changing SLAs, according to some embodiments. This is achieved by examining each application 402. For each application, use data from the protection detail (if protection is not changed), or use the new protection detail (if changed), which provides the resource profile and SLA used to protect this application, 406. The resource required for protecting this application can then be calculated, 408. The required resource for this application is added to the sum, 410. This is repeated for each protected application, 412. Once all resources are added together, it is compared with system resource limit, 414. If this resource limit exceeded user-defined threshold, a warning is sent to user, warning about the potential resource shortage, 416.

One of the critical resources of a Copy Data Storage system is the number of volumes available in the system, or it can be a licensed limit. For each application, number of volumes for the application can be discovered during discovery, in addition, a base copy may be required if there is no storage port available. The number of volumes required to protect this application is number of volumes multiplied by the number of copies calculated from the SLA, and add the number of volumes if base copy is required. This is repeated for all protected applications. The sum of which is the projected volume count required during steady state on the system. This can then be compared with the system limit. If it exceeds a preset limit, a warning can then be issued to customers, before the change takes effect. In some embodiments, the resource limit is a hard limit and cannot be exceeded (e.g., storage associated with a physical device). In some embodiments, there is no physical resource limit (e.g., virtual machine), and the limit can be set by an administrator. Types of resources include storage pools, volumes, CPU resources, etc.

Figure 5:
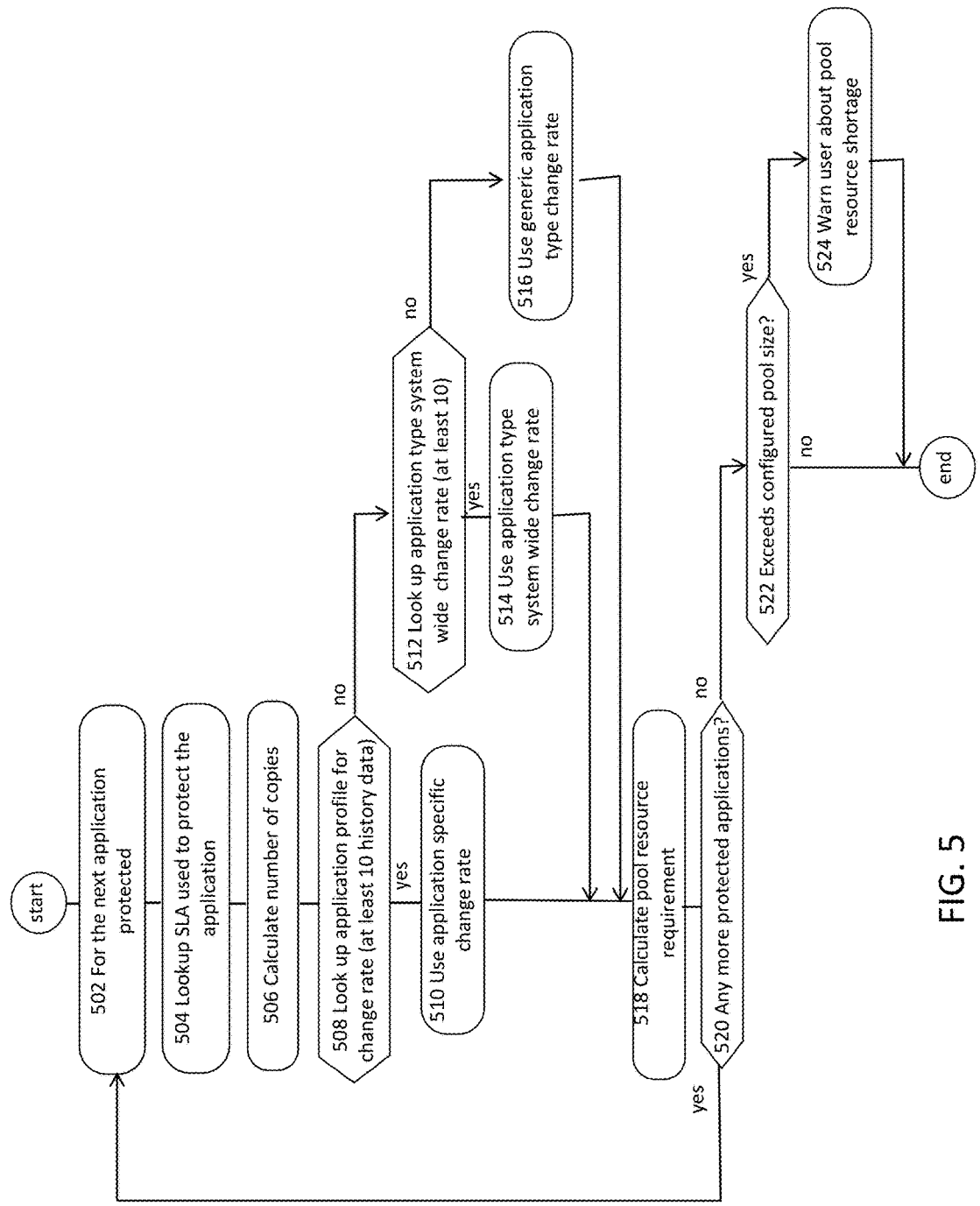
FIG. 5 is a flowchart illustrating the computerized process of warning a user on a different type of resources, pools, when protecting applications, or changing application protection with different SLA and/or profile, according to some embodiments.

FIG. 5 is a flowchart illustrating the computerized process of warning a user on a different type of resources, pools, when protecting applications, or changing application protection with different SLA and/or profile, according to some embodiments. The device (e.g., the computer illustrated in FIG. 6) retrieves the application information, 502. The device looks up the SLA used to protect the application, 504. The device uses data from the protection detail 504, to calculate an estimated number of copies for this SLA, 506. For example, the device can calculate the estimated number of copies over a certain period of time based on the specified retention period(s) specified in the SLA. The device looks up the historical data for change rate of this application, 508. If the system has built up enough historical data (e.g., 10 or more successful backups, or some other number above a pre-determined threshold), the system can use the application specific change rate, 510. For example, if the change rate is approximately 3% per month for several months, the application specific change rate is assumed to be and can be set to 3%.

If there is not enough historical data (or none available) at step 508, the computerized method examines the similar application types for a system-wide change rate, 512. For example, Oracle database and a SQL database can be considered similar application types. If there is enough historical data for a statistically significant threshold (e.g., 10 or more successful backups, or some other pre-configurable threshold) for this application type, use the change rate for similar application type, 514. If there is not enough data, the system proceeds to use a generic change rate, which is collected over time from many customers with a similar application, 516. For example, in situations where the specific change rate cannot be accurately abstracted (e.g., where there is not enough historical data), generalized trends can be used to set a change rate. For example, in general, some applications change more frequently than other applications (e.g., databases as compared to file systems).

The system multiplies the change rate (e.g., from either step 508, 512 or 516) by a number of copies from the SLA calculation to calculate a pool resource requirement 518. In cases where an entire copy of the application is needed (e.g., for a first copy in an out of band copy operation), it is necessary to add a base copy to the application size. If there are no more protected applications 520, the method looks up the resource profile that is used to protect the application; this is the steady state pool resource required to protect this application. For example, assume that an application is 100 GB. Assume further that the change rate is 3%, each copy requires 3 GB. If the service level template requires 10 copies for steady state, then the steady state resource equals 30 GB. When a base copy is also needed, the steady state resource would equal the base copy size plus the copy size (i.e., 100 GB+30 GB), which is 130 GB. By summing up the total steady state pool requirements for all of the protected application(s), the method can compare the total steady state pool requirements with the configured pool size, to see if the required storage exceeds the warning level for the configured pool 522. For example, the warning level can be a pre-configured amount of storage remaining in the pool (e.g., less than 10% space available, less than 20% space available, etc.) A warning can then be issued to users, warning them about the pool resource shortage if the policy change is left in place 524.

Figure 6:
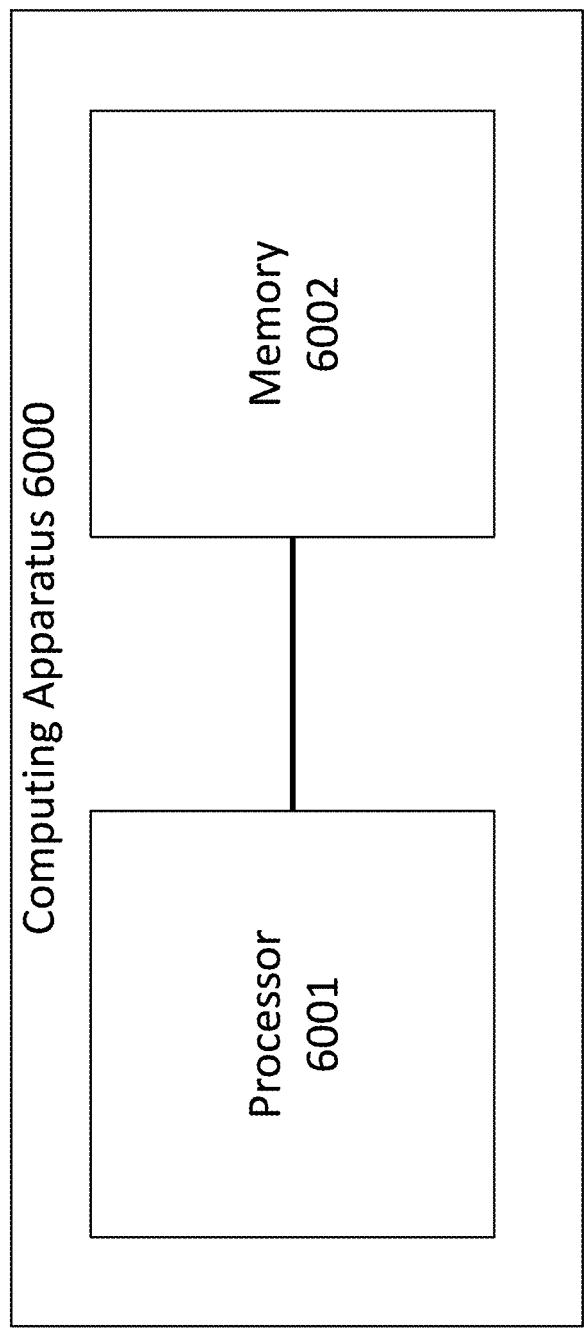
FIG. 6 illustrates an exemplary apparatus configured to provide guardrails for copy data storage, according to some embodiments.

FIG. 6 illustrates an exemplary apparatus configured to provide guardrails for copy data storage, according to some embodiments.

FIG. 6 illustrates an exemplary computerized apparatus 6000 configured to provide Guardrails for a CDS, according to some embodiments. Computerized apparatus 6000 includes a processor 6001 in communication with temporary and/or permanent memory 6002. Memory 6002 stores instructions and is configured to cause the processor 6001 to perform the subject matter described herein, including the apparatus disclosed in FIGS. 2 and 3, and the computerized methods disclosed in FIGS. 4 and 5. As described further herein, the memory 6002 can be flash memory, a magnetic disk drive, an optical drive, a programmable read-only memory (PROM), a read-only memory (ROM), or any other memory or combination of memories. The processor 6001 can be a general purpose processor and/or can also be implemented using an application specific integrated circuit (ASIC), programmable logic array (PLA), field programmable gate array (FPGA), and/or any other integrated circuit. The computerized apparatus 6000 can include a database that may also be flash memory, a magnetic disk drive, an optical drive, a programmable read-only memory (PROM), a read-only memory (ROM), or any other memory or combination of memories. The computerized apparatus 6000 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs.

The same process can be used to warn user about potential over allocation of a dedup pool. The same calculation is applied. As deduplication can further reduce the amount of space required to protect an application of the changes. Further reduction of the change rate can be applied with historical deduplication efficiency, to be used for change rate. The same approach is employed; first check the application specific dedup rate, next application type dedup rate, and lastly, system wide application type dedup rate. The same can be applied if compression is used by further applying the compression ratio.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method of preventing a user from configuring a service level agreement from creating a data management schedule that creates a set of data backups that exceeds data resource limits available for storing the set of data backups, the method being executed by a processor in communication with memory storing instructions configured to cause the processor to:
   receive first data indicative of a schedule to perform a backup of at least one application;
   determine a first amount of pool resources associated with the backup of each of the at least one application according to the received schedule, wherein determining the first amount of pool resources comprises:
      calculating a number of copies of an application associated with the received schedule,
      determining a change rate parameter comprising at least one of:
         an application specific change rate associated with stored historical backup data corresponding to each of the at least one application,
         a system-wide change rate corresponding to change rates associated with stored historical backup data associated with applications similar to each of the at least one application, and
         a generic application change rate, and
      multiplying the change rate parameter for each the at least one application with a size of the application, and with a number of copies of the application associated with each of the at least one application,
   add the first amount of pool resources for each of the at least one application to form an aggregate amount of pool resources;
   determine a first amount of data volumes associated with the backup of each of the at least one application according to the received schedule, wherein determining the first amount of data volumes comprises:
      determining a second amount of data volumes associated with each copy of the at least one application; and
      multiplying the second amount of data volumes with the number of copies of the application associated with the received schedule;
   add the first amount of data volumes for each of the at least one application to form an aggregate amount of data volume resource; and
   transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

2. The computerized method of claim 1, wherein the number of copies of the application associated with the received schedule depends on at least one of a number of copies made per day and a window of operation, the window of operation associated with a time range.

3. The computerized method of claim 1, wherein an application specific change rate is valid when the historical backup data includes statistically significant number of backups associated with the at least first application.

4. The computerized method of claim 1, wherein the processor in communication with memory is further configured to update an application profile associated with the historical backup data, wherein updating the application profile comprises adding backup operation details from successful backup operations to the application profile when the backup operation details are not already included in the application profile.

5. The computerized method of claim 4, wherein the application profile details include at least one of a time of a prior backup, an amount of data copied in the prior backup, a data deduplication efficiency, and a compression efficiency.

6. The computerized method of claim 4, wherein the application profile comprises data indicative of one or more average retention periods of backups.

7. The computerized method of claim 1, wherein the processor in communication with memory is further configured to add:
 a second amount of pool resources associated with a base copy to the aggregate amount of pool resources; and
 a third amount of data volume resource associated with the base copy to the aggregate amount of data volume resource.

8. A computing system for preventing a user from configuring a service level agreement from creating a data management schedule that creates a set of data backups that exceeds data resource limits available for storing the set of data backups, the computing system comprising:
 a processor;
 a memory coupled to the processor and including instructions that, when executed by the processor, cause the processor to:
  receive first data indicative of a schedule to perform a backup of at least one application;
  determine a first amount of pool resources associated with the backup of each of the at least one application according to the received schedule, wherein determining the first amount of pool resources comprises:
   calculating a number of copies of an application associated with the received schedule,
   determining a change rate parameter comprising at least one of:
    an application specific change rate associated with stored historical backup data corresponding to each of the at least one application,
    a system-wide change rate corresponding to change rates associated with stored historical backup data associated with applications similar to each of the at least one application, and
    a generic application change rate, and
   multiplying the change rate parameter for each the at least one application with a size of the application, and with a number of copies of the application associated with each of the at least one application,
  add the first amount of pool resources for each of the at least one application to form an aggregate amount of pool resources;
  determine a first amount of data volumes associated with the backup of each of the at least one application according to the received schedule, wherein determining the first amount of data volumes comprises:
   determining a second amount of data volumes associated with each copy of the at least one application; and
   multiplying the second amount of data volumes with the number of copies of the application associated with the received schedule;
  add the first amount of data volumes for each of the at least one application to form an aggregate amount of data volume resource; and
  transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

9. The computing system of claim 8, wherein the number of copies of the application associated with the received schedule depends on at least one of a number of copies made per day and a window of operation, the window of operation associated with a time range.

10. The computing system of claim 8, wherein an application specific change rate is valid when the historical backup data includes statistically significant number of backups associated with the at least first application.

11. The computing system of claim 8, wherein the memory includes instructions that, when executed by the processor, cause the processor to update an application profile associated with the historical backup data, wherein updating the application profile comprises adding backup operation details from successful backup operations to the application profile when the backup operation details are not already included in the application profile.

12. The computing system of claim 11, wherein the application profile details include at least one of a time of a prior backup, an amount of data copied in the prior backup, a data deduplication efficiency, and a compression efficiency.

13. The computing system of claim 11, wherein the application profile comprises data indicative of one or more average retention periods of backups.

14. The computing system of claim 8, wherein the memory includes instructions that, when executed by the processor, cause the processor to add:
 a second amount of pool resources associated with a base copy to the aggregate amount of pool resources; and
 a third amount of data volume resource associated with the base copy to the aggregate amount of data volume resource.

15. A non-transitory computer readable medium having executable instructions operable to cause an apparatus to:
 receive first data indicative of a schedule to perform a backup of at least one application;
 determine a first amount of pool resources associated with the backup of each of the at least one application according to the received schedule, wherein determining the first amount of pool resources comprises:
  calculating a number of copies of an application associated with the received schedule,
  determining a change rate parameter comprising at least one of:
   an application specific change rate associated with stored historical backup data corresponding to each of the at least one application,
   a system-wide change rate corresponding to change rates associated with stored historical backup data associated with applications similar to each of the at least one application, and
   a generic application change rate, and multiplying the change rate parameter for each the at least one application with a size of the application, and with a number of copies of the application associated with each of the at least one application,
add the first amount of pool resources for each of the at least one application to form an aggregate amount of pool resources;
determine a first amount of data volumes associated with the backup of each of the at least one application according to the received schedule, wherein determining the first amount of data volumes comprises:
 determining a second amount of data volumes associated with each copy of the at least one application; and
 multiplying the second amount of data volumes with the number of copies of the application associated with the received schedule;
add the first amount of data volumes for each of the at least one application to form an aggregate amount of data volume resource; and
transmit a resource shortage warning when the aggregate amount of pool resources exceeds an available amount of pool resources or the aggregate amount of data volume resource exceeds an available amount of data volume resource, thereby preventing a user from configuring a service level agreement that exceeds data resource limits.

16. The non-transitory computer readable medium of claim 15, wherein the number of copies of the application associated with the received schedule depends on at least one of a number of copies made per day and a window of operation, the window of operation associated with a time range.

17. The non-transitory computer readable medium of claim 15, wherein an application specific change rate is valid when the historical backup data includes statistically significant number of backups associated with the at least first application.

18. The non-transitory computer readable medium of claim 15, having executable instructions operable to cause the apparatus to update an application profile associated with the historical backup data, wherein updating the application profile comprises adding backup operation details from successful backup operations to the application profile when the backup operation details are not already included in the application profile.

19. The non-transitory computer readable medium of claim 11, wherein the application profile details include at least one of a time of a prior backup, an amount of data copied in the prior backup, a data deduplication efficiency, and a compression efficiency.

20. The non-transitory computer readable medium of claim 15, having executable instructions operable to cause the apparatus to add:
 a second amount of pool resources associated with a base copy to the aggregate amount of pool resources; and
 a third amount of data volume resource associated with the base copy to the aggregate amount of data volume resource.

* * * * *